UNITED STATES PATENT OFFICE.

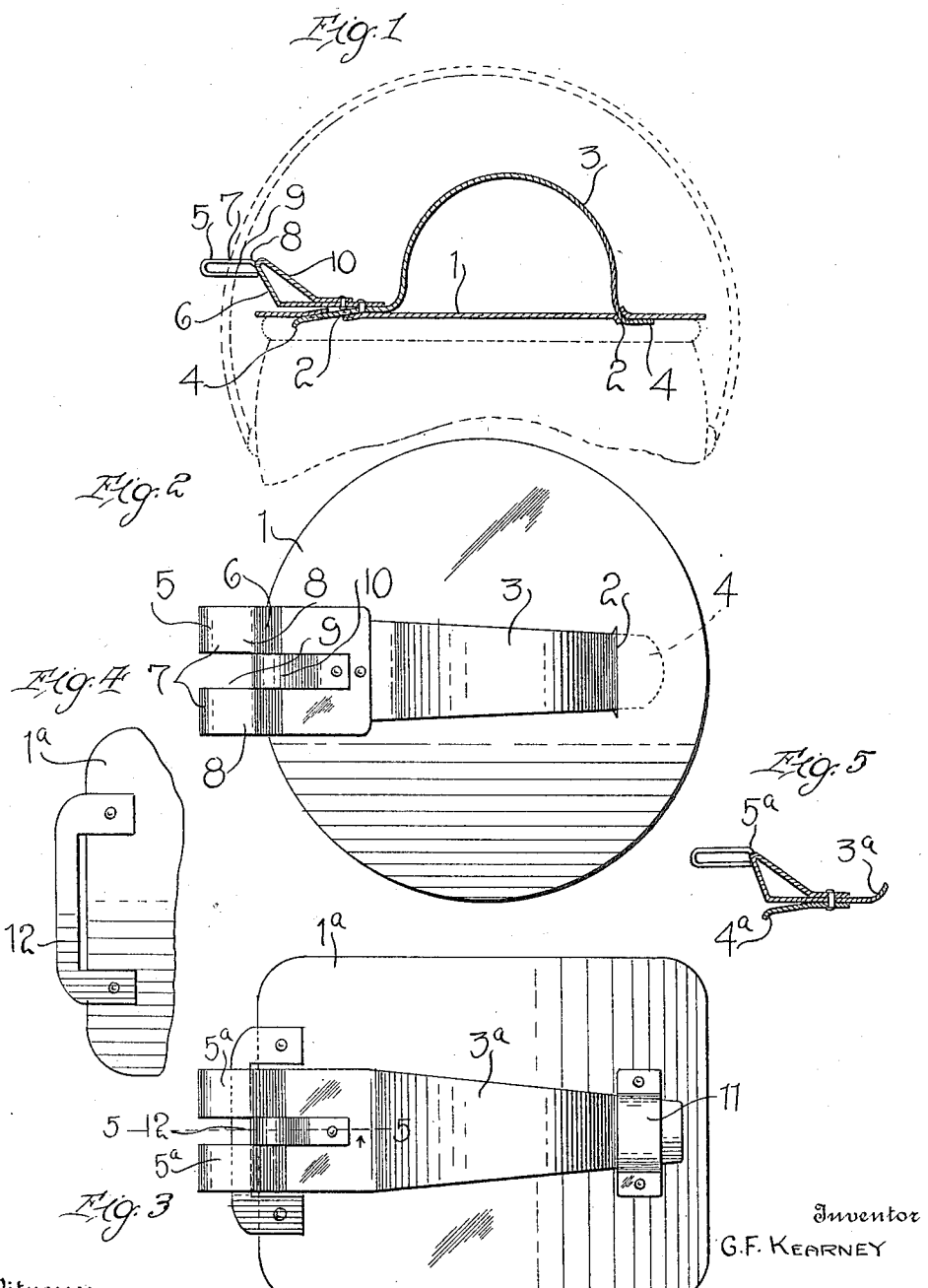

GEORGE FRANKLIN KEARNEY, OF GORHAM, NEW YORK, ASSIGNOR OF ONE-HALF TO CHARLES D. SCOFIELD, OF GORHAM, NEW YORK.

COVER FOR KETTLES AND THE LIKE.

1,106,656.

Specification of Letters Patent.   Patented Aug. 11, 1914.

Application filed February 24, 1914. Serial No. 820,614.

*To all whom it may concern:*

Be it known that I, GEORGE FRANKLIN KEARNEY, a citizen of the United States, residing at Gorham, in the county of Ontario and State of New York, have invented certain new and useful Improvements in Covers for Kettles and the like, of which the following is a specification, reference being had to the accompanying drawings.

This invention comprehends certain new and useful improvements in table and kitchen articles and relates particularly to covers for kettles, pots, and the like.

As every housekeeper knows, burns are often sustained in the use of kettles or similar utensils having swinging bails applied thereto, due to the fact that in the heating of the contents of the kettle on the stove, no means are provided for holding the bail in raised position out of contact with the hot kettle and with a knowledge of these conditions, my invention has for its primary object a simple and efficient construction of kettle cover provided with means whereby the bail may be conveniently held out of contact with the hot wall of the kettle.

A further object of the invention is a device of this character which may be easily attached to or removed from the cover or lid of a kettle, whereby it will not be in the way when it is not required for use, but may also be very conveniently secured in operative position whenever required. And the invention also aims to generally improve devices of this class so as to render them more useful and commercially desirable.

With these and other objects in view, as will more fully appear as the description proceeds, the invention consists in certain constructions, arrangements and combinations of the parts that I shall hereinafter more fully describe and claim.

For a full understanding of the invention, reference is to be had to the following description and accompanying drawings, in which—

Figure 1 is a diagrammatical section of a lid or cover constructed in accordance with one form or embodiment of my invention, the kettle being indicated in dotted lines. Fig. 2 is a plan view thereof. Fig. 3 is a plan view of another form or embodiment of the device hereinafter specifically referred to. Fig. 4 is a fragmentary plan view of the second named form of the invention. Fig. 5 is a fragmentary sectional view therethrough the section being taken substantially on the line 5—5 of Fig. 3.

In that form of the invention illustrated in Fig. 1, 1 designates a kettle cover or lid of any desired construction or design, except as hereinafter noted, the cover being provided at diametrically opposite points near its margin with slots 2. 3 designates a metallic strip which is bowed intermediate of its ends to form a handle portion, the ends of said strip being preferably reduced in width to form engaging lugs 4 adapted to be inserted through or into the slots 2 whereby to secure the device detachably in place. Secured to the handle strip 3, is an angular bail supporting member 5, which is also preferably formed out of a single piece of metal with an upstanding portion 6 terminating in an outstanding portion 7 which is forked, as shown, to provide two fingers 8 and in intervening recess 9 designed to receive the bail. Preferably the extremities which form the fingers 8 are doubled upon themselves as shown, for purposes of reinforcement and to present rounded and not sharp edges, and it is preferred in the manufacture of this portion of the device, that the portion of metal which is cut to produce the intervening recess 9 is turned back and riveted to the main base portion of the bail supporting member 5 so as to constitute an obliquely disposed brace 10.

From as much of the description as has preceded in connection with the correlated views of the accompanying drawing, it will be understood that my improved kettle cover and combined bail support may be very easily and cheaply manufactured. Whenever the cover is not designed for use as a bail support, the handle strip 3 may be compressed so as to retract the engaging lugs 4 from the slots 2. Conversely, whenever the device is desired to be used for a bail support, the lugs may be caused to enter the slots 2 whereby the support will be securely held to the cover with the fingers 8 projecting slightly beyond the margin of the latter so as to engage the bail and hold it in a raised position.

In that form or embodiment of my invention illustrated in Fig. 3, the cover, here designated 1ª is imperforate, as it may be necessary under some conditions, as is evident. In this embodiment of the device, the handle strip 3ª is formed integral with the bail supporting member 5ª corresponding in form to the bail supporting member 5 hereinbefore described, and one of the engaging lugs 4ª is formed out of a separate piece of metal riveted or otherwise secured to the base portion of the bail supporting member. The lid or cover itself, in this form of the device, which is imperforate, as above stated, for engagement by the lugs 4ª is provided with a bowed metallic strip 11 riveted or otherwise secured thereto to form one slot or socket for one of the lugs, and with an angularly formed bar 12 riveted or otherwise secured thereto and projecting beyond the margin thereof to form the other slot for the other lug. The operation of this form of the device will be apparent from the foregoing and it is not deemed necessary to further describe the operation or practical use as the same will be entirely clear.

While the accompanying drawing illustrates what I believe to be the preferred embodiments of my invention, it is to be understood that the invention is not limited thereto, but that various changes may be made in the construction, arrangements and proportions of the various parts without departing from the scope of the invention, as defined in the appended claims.

What is claimed, is:

1. A cover for kettles and the like provided with slots, and a handle member and bail support combined, provided with lugs detachably engageable with the cover by means of said slots, and provided at one end with laterally spaced fingers forming between them a bail receiving recess, for the purpose specified.

2. A cover for kettles or the like, and a bail supporting member provided with means for connection to the cover, said bail supporting member being of angular formation and adapted to project beyond the cover and formed with laterally spaced fingers producing between them a recess for the reception of a bail, the material cut to form said recess being bent backwardly and secured to the base of the bail supporting member whereby to constitute a brace.

3. A cover for kettles and the like, and a combined handle and bail supporting member detachably engageable therewith, the same including outwardly projecting laterally spaced fingers forming a recess for the reception of a bail, and a brace at the inner end of said recess connected to the base of the bail supporting member, for the purpose specified.

In testimony whereof I affix my signature in the presence of two witnesses.

GEORGE FRANKLIN KEARNEY.

Witnesses:
C. D. SCOFIELD,
CHAS. COMPTON.

---

Copies of this patent may be obtained for five cents each, by addressing the "Commissioner of Patents, Washington, D. C."